(12) United States Patent
Ball et al.

(10) Patent No.: US 6,546,668 B1
(45) Date of Patent: Apr. 15, 2003

(54) BAIT STATION FOR FLYING INSECTS

(75) Inventors: William L. Ball, Bluffton, SC (US); Patrick Garvey, Weddington, NC (US)

(73) Assignee: Invicta, Ltd., Ridgeland, SC (US)

( * ) Notice: Subject to any disclaimer, the term of this patent is extended or adjusted under 35 U.S.C. 154(b) by 0 days.

(21) Appl. No.: 09/717,094

(22) Filed: Nov. 22, 2000

(51) Int. Cl.[7] ............................................. A01M 1/20
(52) U.S. Cl. ............................. 43/131; 43/122; 43/107
(58) Field of Search ........................ 43/107, 122, 131, 43/132.1

(56) References Cited

U.S. PATENT DOCUMENTS

| | | | |
|---|---|---|---|
| 550,345 A | 11/1895 | Humphreys et al. | |
| 584,378 A | 6/1897 | Lewis | |
| 1,247,724 A | * 11/1917 | Sassenhoff | 43/107 |
| 1,511,682 A | 10/1924 | Skelly | |
| 1,919,916 A | * 7/1933 | Taylor | 43/107 |
| 2,029,989 A | * 2/1936 | Driggers | 43/122 |
| 3,708,908 A | 1/1973 | Levey | |
| 3,855,727 A | 12/1974 | Canoy | |
| 4,442,624 A | * 4/1984 | Browne | 43/107 |
| 4,557,069 A | * 12/1985 | Caldwell | 43/122 |
| 4,642,936 A | * 2/1987 | Jobin et al. | 43/122 |
| 4,694,604 A | * 9/1987 | Mitchell | 43/107 |
| 4,794,724 A | * 1/1989 | Peters | 43/122 |
| 4,802,303 A | * 2/1989 | Floyd, III | 43/131 |
| D306,061 S | 2/1990 | Cutter | |
| D308,564 S | 6/1990 | Wefler | |
| 5,175,958 A | 1/1993 | Wedemeyer | |
| 5,253,450 A | 10/1993 | Muramatsu | |
| 5,392,558 A | 2/1995 | Blomquist | |
| 5,685,109 A | 11/1997 | Rimback | |
| 5,907,923 A | 6/1999 | Heath et al. | |
| 6,016,625 A | * 1/2000 | Bishoff et al. | 43/107 |
| 6,158,166 A | * 12/2000 | Snell et al. | 43/131 |

* cited by examiner

Primary Examiner—Darren W. Ark
(74) Attorney, Agent, or Firm—Banner & Witcoff, Ltd.

(57) ABSTRACT

A bait station designed to be deployed in an agricultural environment to exterminate flying insects such as fruit flies. The bait station consists of a plurality of shells each providing wall and roof sections. A hinge is provided to pivotable couple the shells together. A locking mechanism is used to lock the shells in a deployment mode. The locking mechanism can include a tab and slot arrangement. There are a plurality of holes on the bait station to disperse the attractant of the bait and attract flying sections. The bottom of the bait station is open assisting in the dissipation of the bait and to enable the flying insect to easily enter the bait station within having to walk through a small hole. An awning extends a sloped roof laterally past the outer wall to keep water and other debris away from the venting holes. A bait holder, containing bait, engages with the wall of the bait station. Flying insects digest the bait and die. The bait station also has a loop on its roof to facilitate deployment of the bait station. These bait stations are designed to be shipped and stored in an open and stacked formation, both to minimize space and costs.

30 Claims, 9 Drawing Sheets

BAIT STATION FOR FLYING INSECTS

FIELD AND BACKGROUND OF THE INVENTION

The present invention relates to a bait station for holding bait for consumption by flying insects, such as fruit flies.

Flying insects pose a devastating threat to organized agriculture, such as fruits and vegetables. Despite this threat, there are relatively few control methods available. In an attempt to combat these flying insects, certain toxic chemicals have been sprayed over the desired agricultural area. This has had an effect of controlling, and sometimes eliminating, large numbers of insects, and this spraying technique is still widely used. However, this widespread spraying of toxic chemicals has caused problems.

For instance, some of these chemicals have harmed personnel that handle these products, despite seemingly adequate precautions. Additionally, people and animals can be accidently sprayed with these chemicals, and in some instances, suffer serious health consequences. Other times, the agricultural product, the supposed beneficiary of this treatment, absorbs or simply retains excessive levels of the sprayed toxins on its outer surface. This can potentially cause health problems to humans who consume the agricultural products. It is also possible that runoff from these agricultural farms may contain large amounts of these chemicals that eventually find their way to remote, unsuspecting destinations. Such runoff of toxic chemicals can potentially upset fragile ecosystems, contaminate fresh water supplies, and pose a serious health risk to humans.

Other methods to control the flying insect populations have been attempted, but they too have suffered drawbacks. A variety of flying insect trap designs have been deployed. However, the insect traps are limited by size as a flying insect trap can only catch and retain as many insects as it has internally available space. Insect traps may also require significant human labor to periodically clean or replace the traps.

Several insect bait stations have also been designed in an attempt to solve this problem. While bait stations have experienced some success at controlling the insect population in its immediately surrounding area, many prior art insect bait station designs have also suffered drawbacks. A major drawback has been the cost of prior bait stations, making the use of such stations cost prohibitive in some circumstances. Other drawbacks have related to the assembly, storage, deployment, and effectiveness of the bait stations.

Some prior art insect bait stations are made from multiple parts. This can cause significant assembly time, especially in view of the large number of bait stations required for most agricultural farms. Further, prior to deployment, the bait stations need to be stored. The shape and configuration of many of the prior art bait stations were known to cause a large amount and often expensive storage area to be necessary.

Further, laborers typically carry these bait stations from the storage area to the field. Due to the size, shape, configuration, and weight of the prior art bait stations, laborers have been severely limited by the number of bait stations they can carry in a single trip from the storage facility to the field. Consequently, laborers could end up carrying only a few bait stations at a time causing a large number of trips to be made to install enough bait stations to effectively cover the desired area. This repeated need to make multiple trips could result in a significant expenditure in man hours of labor.

Prior art bait stations also have some drawbacks regarding effectiveness. One such drawback was that the access openings for the insects were frequently too small for the free and easy entry by flying insects and insects would sometimes have to walk into the station. Other bait stations suffered from poor designs minimizing the air circulation from the bait. Accordingly, an improved bait station for flying insects was thus needed.

SUMMARY OF THE INVENTION

Accordingly, the present invention provides a stackable, lightweight, user-friendly, easily assembled and cost efficient flying insect bait station for use in desired agricultural areas.

The present invention also provides a bait station that is stackable to reduce storage space and enable a laborer to carry many stations in a single trip.

The present invention also preferably includes a single piece injection-molded insect bait station. The bait station may include two curved halves hingeably attached by a foldable connecting piece or hinge that is molded with the curved halves. On the unconnected edges, tab and groove pieces that serve as a locking mechanism when the two curved halves are folded over to complete the cylinder. A roof is sloped to provide improved water drainage. A deployment loop is attached to the center of the sloped roof, and is used to place the bait station in desired locations. In the open position, the bait station is in an ideal configuration to be stacked, allowing for compact shipping and storage.

The bait station also preferably includes a plurality of holes. A linear hole near the middle of the cylinder is used to attach a bait holder to the bait station. Circular holes above the linear holes and near the top of the cylinder are vent holes that disperse the attractant of the bait to lure flying insects. The flying insects then can enter the bait station through either the vent holes or the open bottom portion, become affected by the bait, and die.

According to one aspect of the present invention, a bait station for flying insects is provided. The bait station includes a vertical side wall enclosure and a roof. The vertical side wall enclosure has inner and outer surfaces and top and bottom portions. The roof is positioned adjacent the top portion of the side wall enclosure. An interior is defined by the inner surface of the vertical side wall enclosure and the roof. The bottom portion of the vertical side wall enclosure is substantially open causing the interior to be substantially unbounded from below. When bait is positioned in the interior, insects may freely fly upward into the bait station through the substantially open bottom portion of the vertical side wall enclosure.

According to another aspect of the present invention, a bait station for flying insects is provided. The bait station includes a vertical side wall enclosure and a roof. The vertical side wall enclosure has inner and outer surfaces and top and bottom portions. The vertical side wall enclosure further has a plurality of vent holes extending from the inner surface to the outer surface. The roof is positioned adjacent the top portion of the side wall enclosure, and has an awning extending past the outer surface of the vertical side wall enclosure. An interior is defined by the inner surface of the vertical side wall enclosure and the roof. The interior is intended for holding bait, and attractant from such bait can permeate through the vent holes to attract flying insects.

According to yet another aspect of the present invention, a bait station for flying insects is provided. The bait station includes a vertical side wall enclosure and a roof. The vertical side wall enclosure includes a plurality of shell elements, each pivotally coupled to an adjacent shell element. The vertical side wall enclosure further has inner and outer surfaces, top and bottom portions, and a plurality of vent holes extending from the inner surface to the outer surface. The roof is positioned adjacent the top portion of the side wall enclosure. An interior is defined by the inner surface of the vertical side wall enclosure and the roof. The interior is intended for holding bait, and attractant from such bait is permitted to permeate through the vent holes to attract flying insects.

DETAILED DESCRIPTION OF THE PREFERRED EMBODIMENTS

Figure 1:
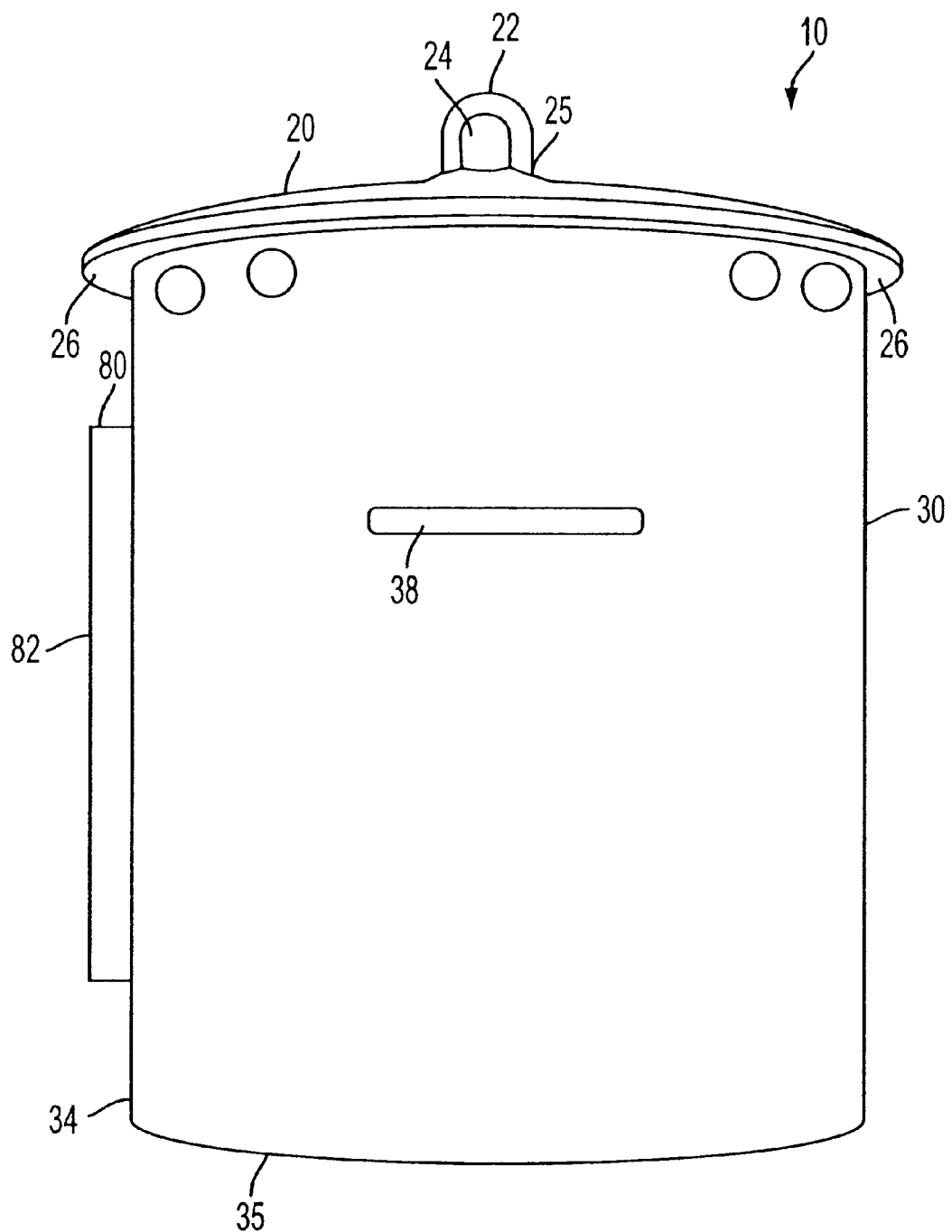
FIG. 1 is a side elevational view of the bait station in a closed position.
Figure 2:
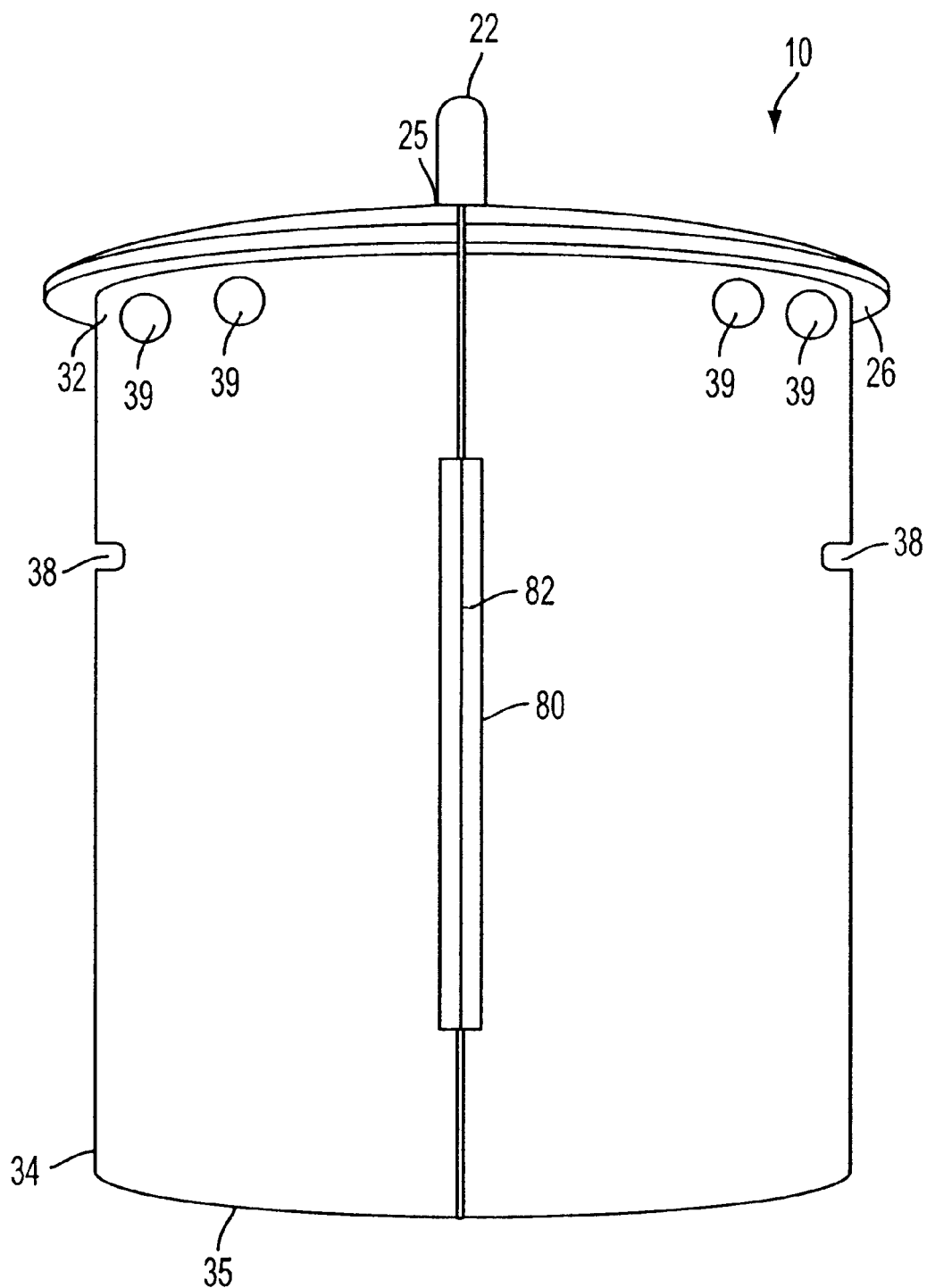
FIG. 2 is a side elevational view of the bait station in a closed position rotated 90° from FIG. 1.
Figure 9:
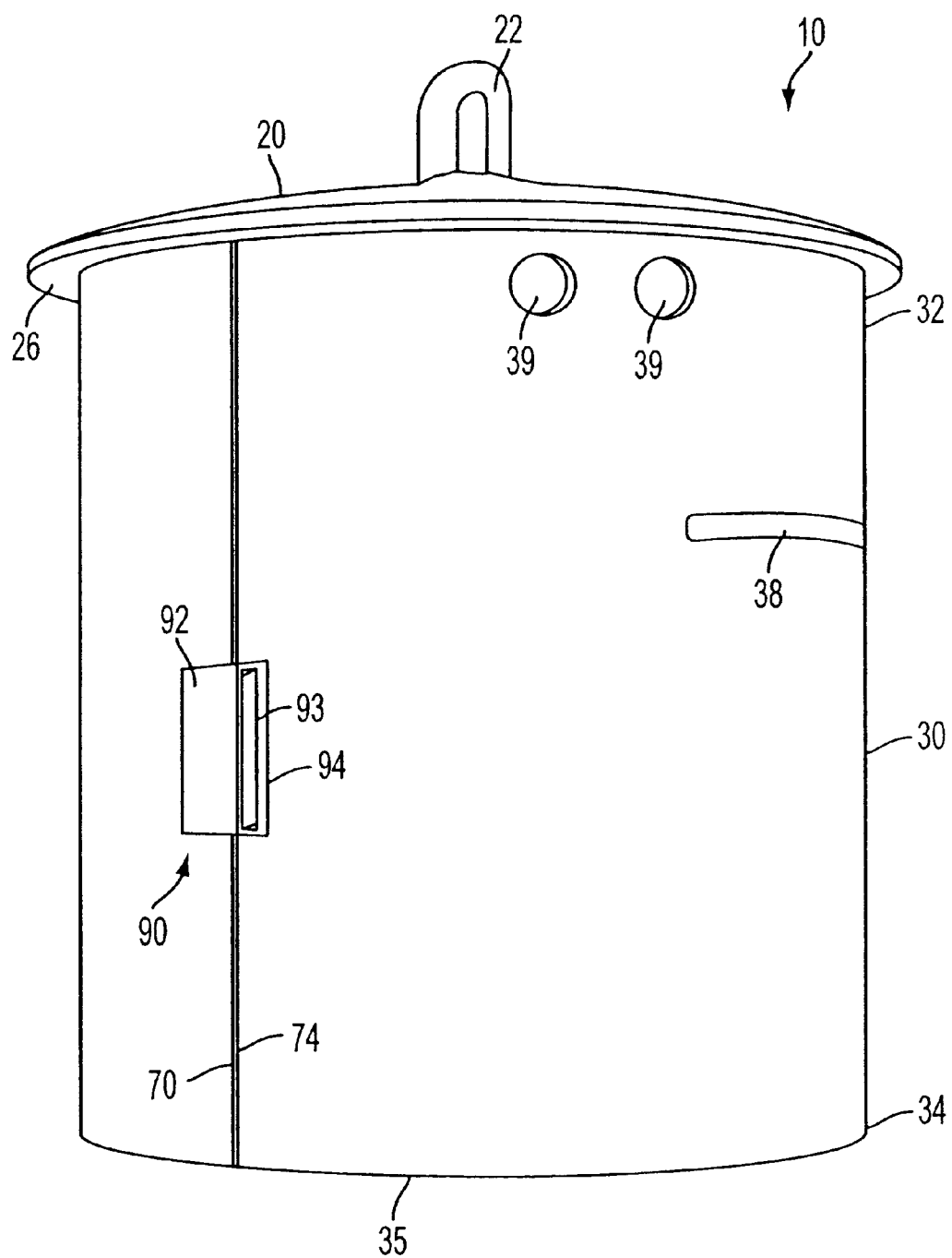
FIG. 9 is a side elevational view of the bait station showing the locking arrangement.

FIGS. 1, 2, and 9 depict side views of the bait station 10 of the present invention. In sum, bait station 10 includes a vertical wall enclosure 30, a roof 20 positioned at the top portion 32 of the vertical wall enclosure 30, and a bottom opening 35 at the bottom portion 34 of the vertical wall enclosure 30. As shown in the cross section of FIG. 3, a bait holding system 50, containing a bait 54 which is toxic to the flies, is positioned inside of the vertical wall enclosure 30. In operation, flying insects, such as fruit flies, are drawn to the attractant of the bait 54. The insects fly up through the bottom opening 35, eat the bait 54, and later die from the consumption of the bait 54.

Figure 3:
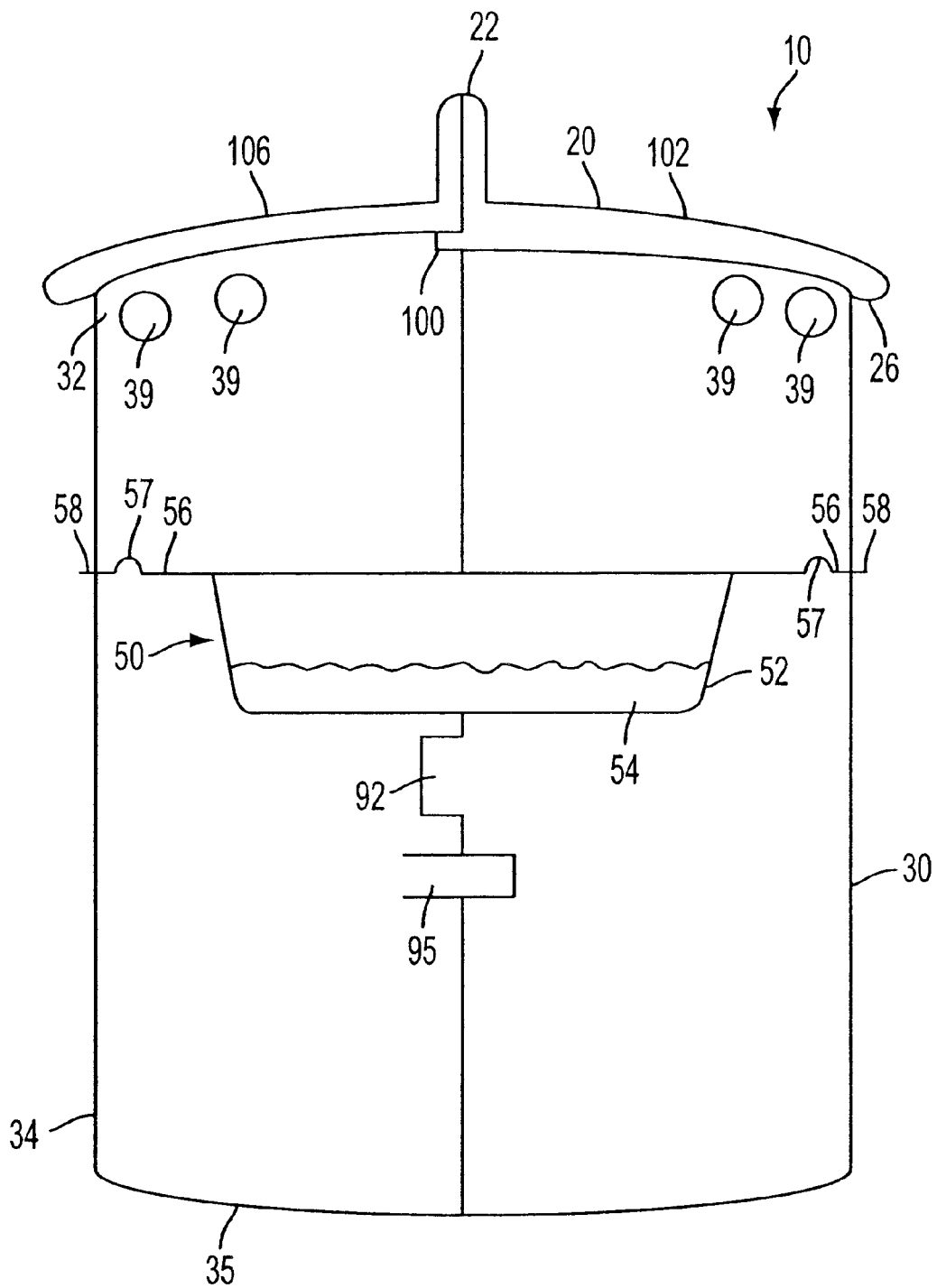
FIG. 3 is a vertical cross sectional view the bait station of FIG. 2.

The vertical wall enclosure 30 further includes a portion for interfacing with the bait holding system 50. A preferred bait holding system 50 is shown in FIG. 3. The bait holding system 50 preferably includes a bait container 52 for holding the bait 54 and a pair of coupling extensions 56 for attaching the bait container 52 to the vertical wall enclosure 30. Each of the coupling extensions 56 is flexible between its end 58 and the container 52. Moreover, the vertical wall enclosure 30 includes holes 38 therein which are shaped similar to the cross-section of the ends 58 of the coupling extensions 56.

To install the bait holding system 50, the container 52 may be inserted up through the bottom opening 35. The coupling extensions 56 are slightly flexed, and the ends 58 of the coupling extensions 56 are inserted through the complimentary shaped holes 38. The fit between the ends 58 and holes 38 is tightly toleranced and a friction fit may be achieved to securely hold the bait 54 relative to the vertical wall enclosure 30.

Additionally, or alternatively, centering stops 57 may be located on the coupling extensions 56 and formed by an upwardly or downwardly protrusion. The stops 57 serve to keep the container 52 centered between the enclosure 30 and prevent the container 52 from inadvertently falling out. Further, if desired, these centering stops 57 may be designed so that they form the flex point or resist flexing in that area. In a preferred arrangement, as shown, the holes 38 and the cross section of the ends 58 are thin and elongated. When the bait holding system 50 is installed into the vertical wall enclosure 30, the distal ends 58 of the coupling extensions 56 may optionally protrude from the holes 38 by a small distance.

The vertical wall enclosure 30 further includes vent holes 39 for bait attractant. The attractant from the bait 54 will permeate away from the container 52 and the vent holes 39 will facilitate the permeation of the attractant of the bait 54 through the vertical wall enclosure 30 to the region outside of the bait station 10. In a preferred arrangement, as shown, the vent holes 39 are preferably positioned above the location of the bait 54, adjacent the top portion 32 of the vertical wall enclosure 30, and immediately below the roof 22. This is helpful to facilitate the dissipation of attractant from the bait 54 due to evaporation and to due to air entering through the bottom opening 35.

While the vent holes 39 are primarily intended to allow the bait attractant to escape and lure insects, it may also be possible that insects can enter the bait station 10 through these holes 39 depending upon the relative size of the insect and the holes 39. Generally, however, the insects will likely enter the bait station 10 from the bottom opening 35 adjacent to the bottom portion 34 of the vertical wall enclosure 30. In a preferred arrangement, the size of the vent holes 39 are ⅛ inch to ½ inch in diameter. Such a size is particularly advantageous for its primary function of attractant dispersal, as the holes 39 are large enough to allow enough attractant to escape, and is also small enough so that the bait does not exhaust prematurely.

The roof 20 is highest at its center 25, and then slopes downwards to form an awning 26 that extends radially outward from the vertical wall enclosure 30. The downward slope of the roof 20 and the awning 26 maximizes the drainage due to rain and prevents water from collecting on the top of the bait station 10. Further, the awning 26 reduces the amount of rain water and other debris that may collect in or enter through the vent holes 39 and inhibit the attractant of the bait 54 dissipating from the station 10. The exact length of extension of the awning 26 past the vertical wall enclosure 30 may be any desired amount. In a preferred arrangement, it extends a distance between ⅛ inch to ½ inch, approximately ¼ inch past the outer wall surface of the vertical wall enclosure 30.

To deploy the bait station 10, it may be vertically suspended, preferably amidst the agriculture where the target flying insects frequent. To facilitate the deployment of the bait station 10 by suspension, a plate or loop 22 having a hole 24 is located in the center 25 of the roof 20. The loop 22 is designed so that a string, hook, branch, or another item may be passed through it. While one centrally-located loop 22 is preferred, it is recognized that one or more loops may be used and positioned anywhere as long as they are in a configuration that would allow for a substantially vertical bait station deployment.

In one preferred embodiment, the bait station 10 is formed by two half portions or half shells 60 and 62. Each of the half shells 60 and 62 include a half of the roof 20 and a half of the vertical wall enclosure 30. The inner wall surface 64 and the outer wall surface 66 of the shells 60 and 62 form the inner and outer wall surfaces of the vertical wall enclosure 30. The first shell 60 has an inner or hinge side edge 68 and a distal side edge 70 opposed from the hinge side edge 68. Similarly, the other shell 62 has an inner or hinge side edge 72 and a distal side edge 74 opposed from the hinge side edge 72.

Figure 4:
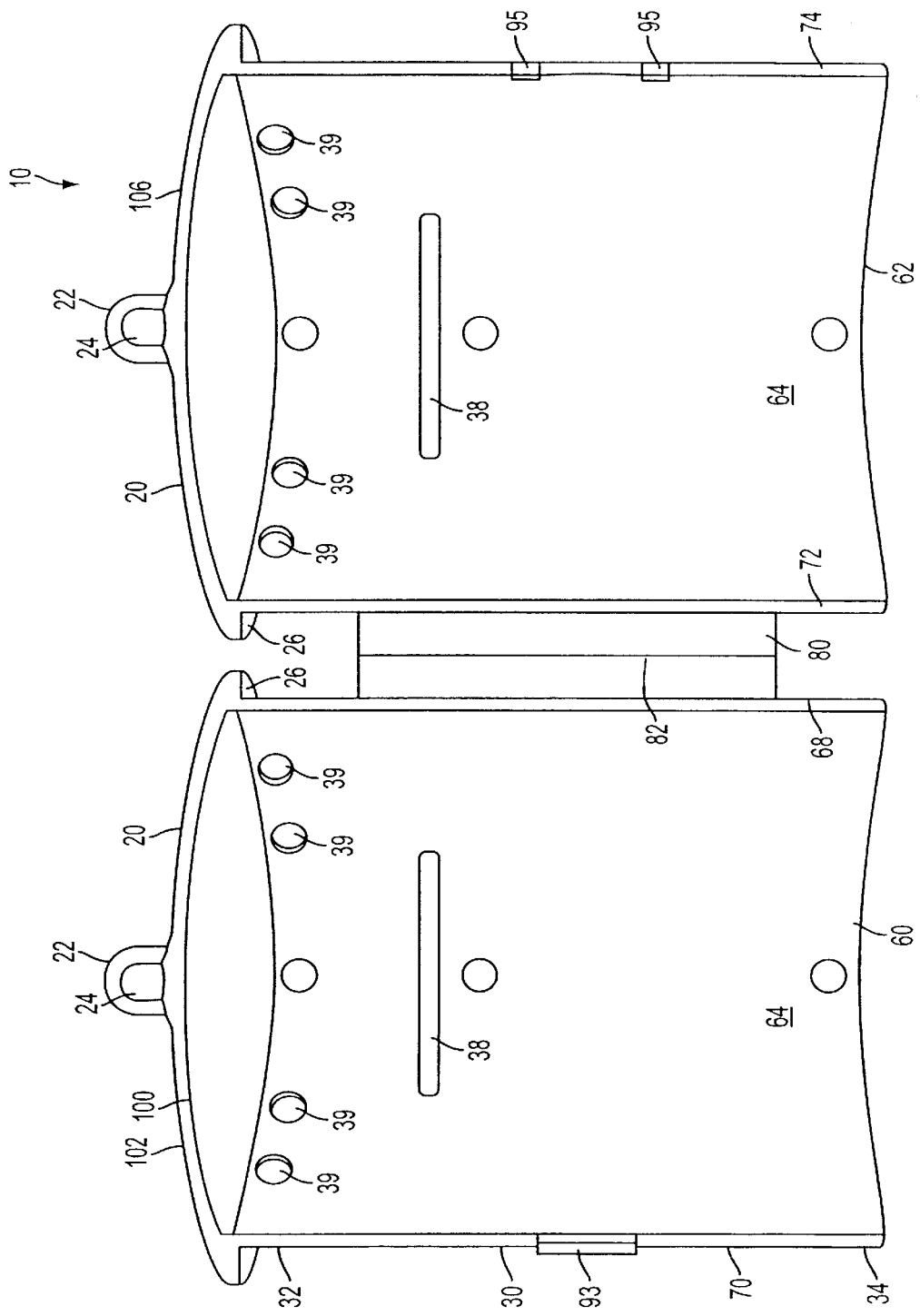
FIG. 4 is an elevational view of the inside of the bait station in an open position.
Figure 5:
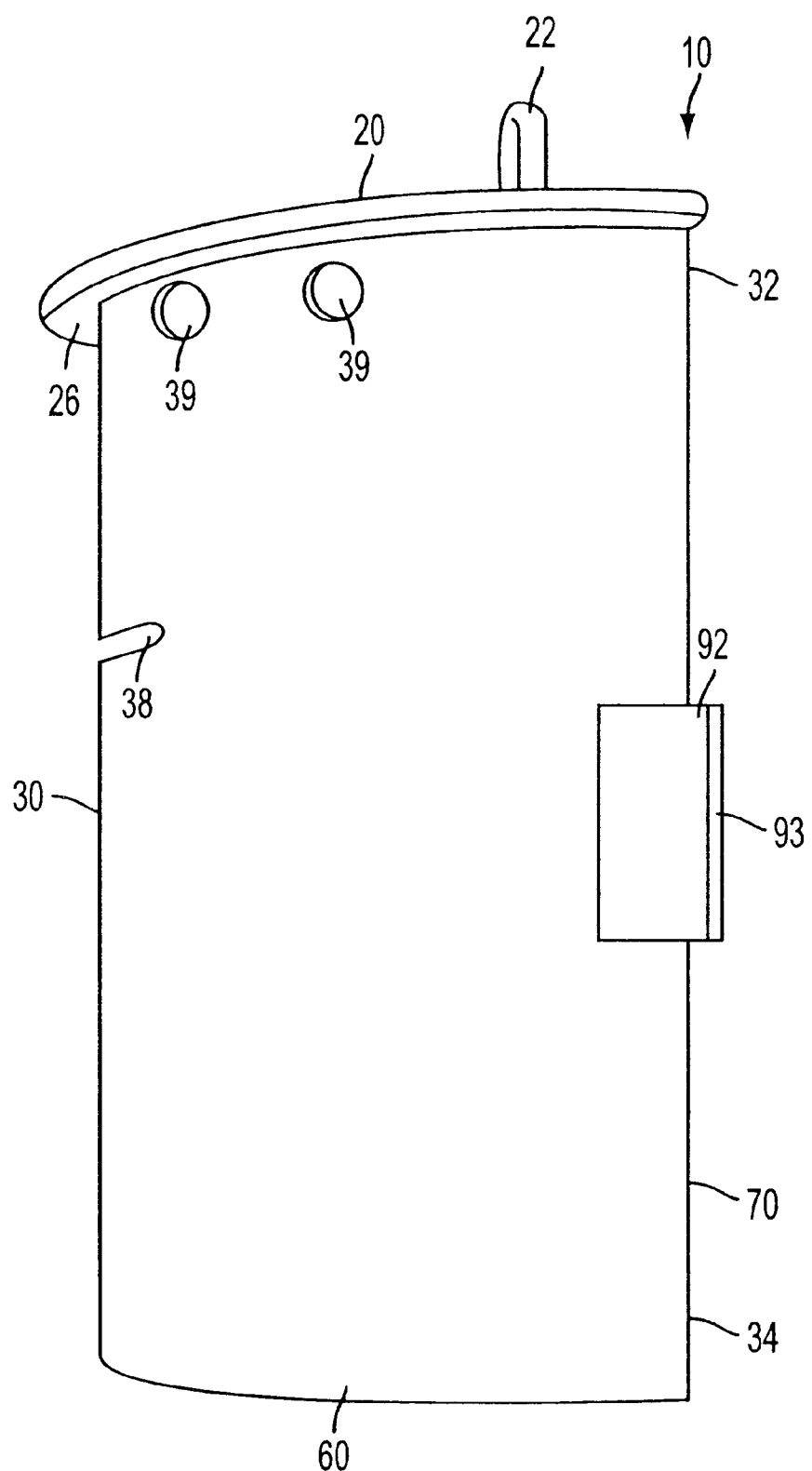
FIG. 5 is a side elevational view of the open bait station of FIG. 4 showing the tab structure of the locking mechanism.
Figure 6:
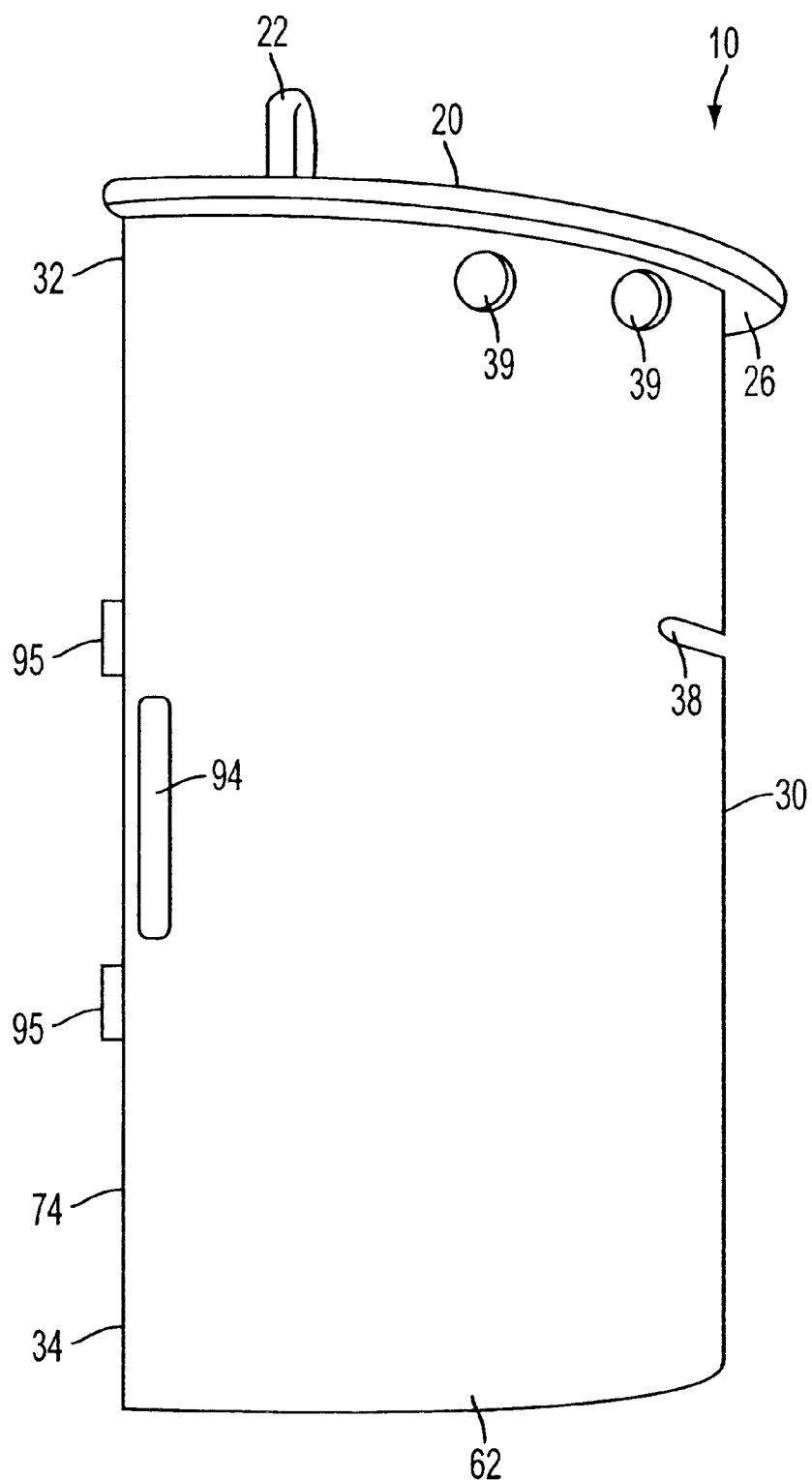
FIG. 6 is a side elevational view of the open bait station of FIG. 4 showing the slot structure of the locking mechanism and the guide protrusions.
Figure 7:
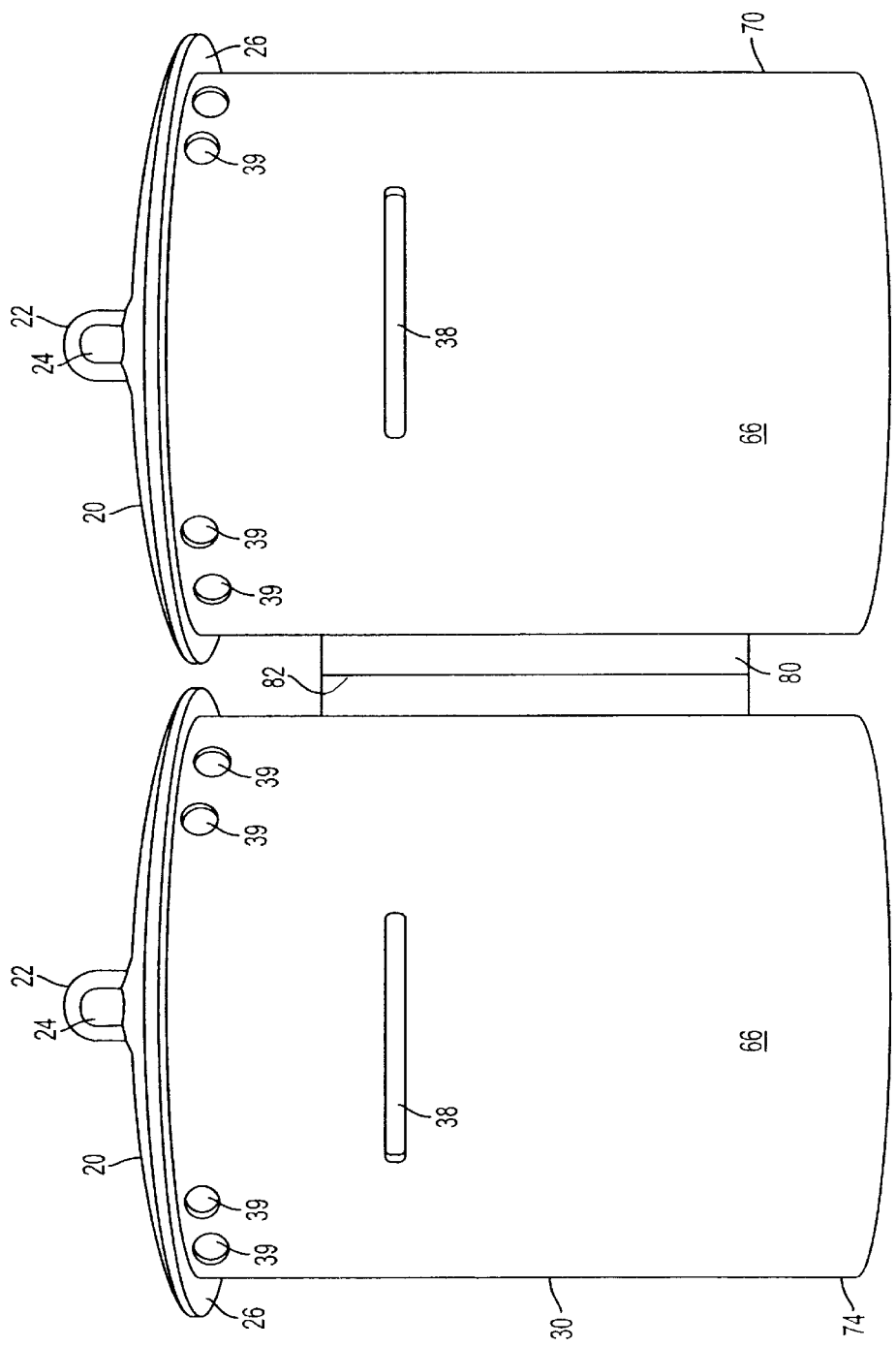
FIG. 7 is an elevational view of the outside of the bait station in an open position.

The half shells 60 and 62 are pivotally coupled together via a hinge 80 which is attached to the hinge side edges 68 and 72 of the shells 60 and 62. The hinge 80 includes a line 82 which is weakened or made thinner. Accordingly, the hinge 80 is designed to crease and fold over when the bait station 10 is deployed. That is, when the bait station 10 is converted from an open or storage condition, as shown in FIG. 4, to a closed or deployment condition, as shown in FIGS. 1 and 2. Thus, the weakened line 82 forms a pivot axis, and that pivot axis about which the portions of the hinge 80 attached to each half shell 60 and 62 fold. This pivot axis is outside of the outer wall of the vertical wall enclosure 30 when the bait station 10 is in a closed condition.

A locking mechanism 90 is used to lock the two shells 60 and 62 together when the shells 60 and 62 are moved into a closed position. The locking mechanism 90 includes a primary locking protrusion 92 on the distal side edge 70 of one shell 60 and a primary slot 94 on the distal side edge 74 of the other shell 62. The primary locking protrusion 92 includes an outwardly extending lip 93 sized to fit in the primary slot 94. Preferably, the protrusion 92 is located near the center of the distal side edge 70, and includes a flat integrated extension of the side edge 70.

Further, the locking arrangement may include one or more inner supports 95. The inner supports 95 are located on inner wall surface 64 of the distal side edge 74 of the shell 62 that has the primary slot 94. The inner supports 95 bias the distal side edge 70 outwardly in the region of the primary guide protrusion 92. Thus, once the primary guide protrusion 92 is inserted into the slot 94, the inner supports 95 will tend to hold the lip 93 in the slot 94 and prevent any unintentional disengagement that would open the vertical wall enclosure 30. As shown in the figures, a pair of inner supports 95 are used and are positioned on opposing sides of the primary protrusion 92 and slot 94 as shown.

In a preferred arrangement, in addition to the primary locking arrangement described above, the locking mechanism 90 may also include a secondary locking arrangement, not shown. The secondary locking arrangement can include at least one secondary locking protrusion located on inner wall surface 64 of the distal side edge 74 of the shell 62 that has the primary slot 94. Each secondary locking protrusion could also include an outwardly extending lip similar to the primary guide protrusion 92. The inner wall surface of the other shell 60 would preferably include a corresponding number of recesses in the wall surface. Each recess would receive and form a catch for a respective outwardly extending lip. In one arrangement, a pair of secondary locking protrusions could be used and positioned on opposing sides of the primary protrusion 92 and slot 94.

To help the roof 20 serve as a watertight water deflector so that water striking the top of the roof 20 will drip downward off the radial edge of the awning 26 instead of entering inside the bait station 10, a guiding or sealing system between the shells 60 and 62 is provided in the roof region. In one arrangement, as shown, the roof 20 is formed in both shells 60 and 62 by an upper roof member 102 and 106. An inner guide ridge 100 extends from one of the roof members, i.e., roof member 102. Preferably, at the center line where the shells 60 and 62 abut, the inner guide ridge 100 extends from its upper roof member 102 and below the other upper roof member 106. When the shells 60 and 62 are brought together, the inner guide ridges 100 will correctly locate the other upper roof member 106 and serve to prevent water from entering between the upper roof members 100 and 104 along the line where they abut.

Figure 8:
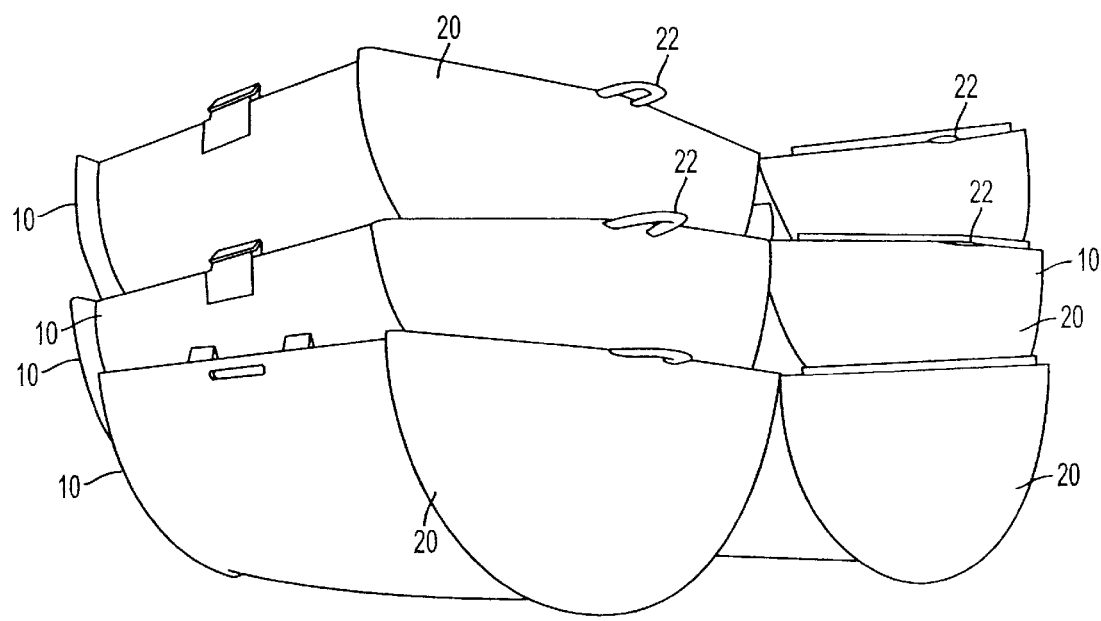
FIG. 8 is a perspective view of six open bait stations in a stacked configuration.

Since the bait station 10 is made up of two shells 60 and 62, it is easily stackable of economic storage and transport. As shown in FIG. 8, multiple bait stations 10 may be stacked so that many bait stations 10 can fit within a small area. The arcuate convex outer surface of the shells 60 and 62 can fit within the concave inner surface of another pair of shells 60 and 62. Further, as shown, the linear orientation may be reversed in successive bait stations 10 so that the concave inner outer surface of shell 60 of one bait station 10 receives the convex outer surface of the other shell 62 of a bait station 10 stacked thereupon. That is, the roof 20 is facing the opposite direction in alternate stacked open stations 10.

In operation, a number of bait stations 10 may be taken from a storage facility to the field for deployment by a worker. The worker will also include a corresponding number of bait holders 50. Because of the compact stacked nature, the worker may easily carry a large number of bait stations 10 for deployment in a single trip. When the worker reaches an area for deployment, he will take a single open bait station 10 from the stack and fold the two shells 60 and 62 toward each other. During this process, the roof region will mate and seal and the primary and secondary locking features will engage. More specifically, both the inner guide ridge 100 and both the roof surfaces 102 and 106 will abut together to form a substantially watertight fit and serve to deflect water away from the vent holes 39 in the wall of the vertical wall enclosure 30. Further, the outwardly extending lip 93 of the primary locking protrusion 92 fits inside the primary slot 94 to lock the two shells 60 and 62 together. With the two shells 60 and 62 secured, the worker may slide the bait holder 50 with the bait 54 through the bottom opening 35. The bait supporting member 56 may be slightly flexed, and the ends 58 of the bait supporting members 56 may be inserted through the complimentary shaped holes 38 to retain the bait 54 within the bait station 10 in a friction fit arrangement. The bait station 10 may be suspended by any desired manner, preferably by using the loop 22 and rope or a branch, and hanging the bait station 10 in a suitable location.

Once deployed, the bait 54 dissipates into the air around the bait station 10. This dissipation is aided by a circulation path that can enable air from below the bait station 10 to come up through the bottom opening 35 and out of the vent holes 39. The majority of flying insect in the target species will likely fly up into the bait station 10 through the open bottom 35 and eat the bait 54. Others, may come in through the venting holes 39. Based on the strength of the bait 54 relative to the target species, the flying insects will die shortly after eating the bait 54. The awning 26 on the roof 20 will cause rain that hits the roof 20 to drain away from the venting holes 39 to minimize the adverse effect on the dissipation of the attractant to lure the target species of flying insect. Accordingly, the present invention provides a bait station 10 that is economical to manufacture, store, and deploy.

In a preferred embodiment, the bait stations 10 have a circular diameter between three to eight inches, with a vertical height between three to twelve inches. However, it is recognized that other dimensions may be used based upon the target species size and the locations the bait stations will be stored and deployed. Further, the bait station 10 is preferably made form a single injection molded part. Preferred materials include a high density polyethylene and polyvinyl chloride. However, other types of plastic or other material may be used. Further, while the depicted shape of the bait station is cylindrical, it is recognized that other shapes, such as hexagonal, may be used. Alternative arrangements may be used with regard to the bait and bait holder. For example, a different fitting arrangement may be used between the bait holder 50 and the vertical wall enclosure 30. Additionally, any type of bait may be used based on a number of preference factors including the type of target species, the type of agriculture protected, and various governmental regulations.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A bait station for flying insects comprising:
    a vertical side wall enclosure, said vertical side wall enclosure includes a plurality of pivotally connected curved sections, inner and outer surfaces, a bottom end, and a top portion, the bottom end of the vertical side wall enclosure defining a bottom opening;
    a roof positioned adjacent the top portion of the side wall enclosure;
    an interior defined by and fully surrounded by the inner surface of the vertical side wall enclosure and extending substantially from the top portion to the bottom end;
    wherein said bottom end of the vertical side wall enclosure is substantially open and void of any structure spanning the bottom opening causing the interior to be substantially unbounded from below, such that when bait is positioned in the interior, insects may freely fly upward into the bait station through the substantially open bottom end of the vertical side wall enclosure.

2. The bait station of claim 1, wherein said vertical side wall enclosure includes a plurality of vent holes.

3. The bait station of claim 2, further comprising a bait holder for holding bait, and bait holder holes on opposite sides of the vertical side wall enclosure, wherein said bait holder is sized to fit into said bait holder holes and extend across the interior.

4. The bait station of claim 3, wherein said vent holes are located above said bait holder holes.

5. The bait station of claim 1, further comprising a hinge extending between said pivotally connected sections, said hinge including a pivot axis spaced from said vertical side wall surfaces.

6. The bait station of claim 1, wherein said roof includes an awning extending past the outer surface of the vertical side wall enclosure at an upper portion.

7. The bait station of claim 6, wherein said roof includes a hanging plate and a hole therein for suspending said bait station.

8. A bait station for flying insects comprising:
    a vertical side wall enclosure, said vertical side wall enclosure having inner and outer surfaces, a bottom end, and a top portion;
    a roof positioned adjacent the top portion of the side wall enclosure;
    an interior defined by and fully surrounded by the inner surface of the vertical side wall enclosure and the roof;
    wherein said bottom end of the vertical side wall enclosure is substantially open causing the interior to be substantially unbounded from below, such that when bait is positioned in the interior, insects may freely fly upward into the bait station through the substantially open bottom end of the vertical side wall enclosure;
    a bait holder for holding bait, said bait holder including a bait container, and
    bait holder holes on opposite sides of the vertical side wall enclosure, wherein said bait holder is sized and configured to fit into and is coupled to, said bait holder holes and extends across the interior;
    wherein said bait station is void of structure directly beneath the bait container.

9. A bait station for flying insects comprising:
    a vertical side wall enclosure, said vertical side wall enclosure having inner and outer surfaces and a top portion and a bottom end, said vertical side wall enclosure further having a plurality of vent holes extending from the inner surface to the outer surface;
    a roof positioned adjacent the top portion of the side wall enclosure, said roof having an awning extending past the outer surface of the vertical side wall enclosure;
    an interior defined by the inner surface of the vertical side wall enclosure and the roof, said interior intended for holding bait, wherein attractant from such bait being permitted to permeate through said vent holes to attract flying insects, said bottom end of the vertical side wall enclosure being substantially open and substantially void of passageway blocking structure permitting a flying insect to fly directly upward into the interior from beneath the bait station at substantially any region below the interior; and
    a bait holder for holding bait, and bait holder holes on opposite sides of the vertical side wall enclosure, wherein said bait holder is sized to fit into, and is coupled to, said bait holder holes and extends across the interior.

10. The bait station of claim 9, wherein said vent holes are located above said bait holder holes.

11. A bait station for flying insects comprising:
    a vertical side wall enclosure, said vertical side wall enclosure including a plurality of curved shell elements each pivotally coupled to an adjacent curved shell element, inner and outer surfaces and having top and bottom portions, said vertical side wall enclosure further having a plurality of vent holes extending from the inner surface to the outer surface;
    a roof positioned adjacent the top portion of the side wall enclosure;
    an interior defined by the inner surface of the vertical side wall enclosure and the roof, said interior intended for holding bait, wherein attractant from such bait being permitted to permeate through said vent holes to attract flying insects; and
    a hinge extending between said pivotally coupled curved shell elements, said hinge including a pivot axis spaced from said vertical side wall surfaces that extends in a direction from the top portion to the bottom portion.

12. The bait station of claim 11, wherein said bottom portion of the vertical side wall enclosure is substantially open causing the interior to be substantially unbounded from below, such that when bait is positioned in the interior, insects may freely fly upward into the bait station through the substantially open bottom portion of the vertical side wall enclosure.

13. The bait station of claim 12, further comprising a bait holder, said bait holder being coupled to said vertical side wall enclosure and extending across the interior.

14. The bait station of claim 12, further comprising a locking mechanism having first and second interfitting elements, wherein said pivotally coupled shell elements include first and second sections, wherein said first shell element includes said first element of said locking mechanism and said second shell element includes said second element of said locking mechanism.

15. The bait station of claim 14, wherein said first element of the locking mechanism is a tab and the second element of the locking mechanism is a slot.

16. The bait station of claim 11, wherein said shell elements and said hinge are integrally formed.

17. A bait station for flying insects comprising:
   a vertical side wall enclosure, said vertical side wall enclosure having inner and outer surfaces and top and bottom portions, said vertical side wall enclosure further having a plurality of vent holes extending from the inner surface to the outer surface, wherein said vertical side wall enclosure includes a plurality of curved shell elements each pivotally connected to an adjacent curved shell element forming a complete enclosure;
   a roof positioned adjacent the top portion of the side wall enclosure, said roof having an awning extending past the outer surface of the vertical side wall enclosure;
   an interior defined by the inner surface of the vertical side wall enclosure and the roof, said interior intended for holding bait, wherein attractant from such bait being permitted to permeate through said vent holes to attract flying insects;
   further comprising a hinge extending between said pivotally connected sections, said hinge including a pivot axis spaced from said vertical side wall surfaces.

18. The bait station of claim 17, wherein said hinge and each of the plurality of pivotally connected shell elements are intergrally molded as a unitary structure.

19. The bait station of claim 18, wherein the plurality of pivotally connected shell elements consists of two pivotally connected shell elements.

20. A bait station for flying insects comprising:
   a vertical side wall enclosure, said vertical side wall enclosure including a plurality of curved shell elements each pivotally coupled to an adjacent curved shell element, inner and outer surfaces and having top and bottom portions, said vertical side wall enclosure further having a plurality of vent holes extending from the inner surface to the outer surface;
   a hinge extending between said pivotally coupled shell elements, said hinge including a pivot axis spaced from said vertical side wall surfaces;
   a roof positioned adjacent the top portion of the side wall enclosure; and
   an interior defined by the inner surface of the vertical side wall enclosure and the roof, said interior intended for holding bait, wherein attractant from such bait being permitted to permeate through said vent holes to attract flying insects;
   wherein said bottom portion of the vertical side wall enclosure is substantially open causing the interior to be substantially unbounded from below, such that when bait is positioned in the interior, insects may freely fly upward into the bait station through the substantially open bottom portion of the vertical side wall enclosure, and wherein said roof includes an awning extending laterally past the outer surface of the vertical side wall enclosure.

21. The bait station of claim 20, further comprising a locking mechanism having first and second interfitting elements, wherein said pivotally coupled shell elements include first and second sections, wherein said first shell element includes said first element of said locking mechanism and said second shell element includes said second element of said locking mechanism.

22. A bait station for flying insects comprising:
   a vertical side wall enclosure, said vertical side wall enclosure having inner and outer surfaces and top and bottom portions, said vertical side wall enclosure further having a plurality of vent holes extending from the inner surface to the outer surface;
   a roof positioned adjacent the top portion of the side wall enclosure, said roof having an awning extending past the outer surface of the vertical side wall enclosure;
   an interior defined by the inner surface of the vertical side wall enclosure and the roof, said interior intended for holding bait, wherein attractant from such bait being permitted to permeate through said vent holes to attract flying insects;
   wherein said vertical side wall enclosure includes first and second curved shell elements, and an integrally molded hinge member permitting the first and second shell elements to be pivotally attached to each other and move about a preformed hinge axis between a, first open position and second position that forms a complete enclosure; and
   a locking mechanism having first and second interfitting elements, wherein said first curved shell element includes said first element of said locking mechanism and said second curve shell element includes said second element of said locking mechanism.

23. The bait station of claim 22, wherein said bottom portion of the vertical side wall enclosure is substantially open causing the interior to be substantially unbounded from below, such that when bait is positioned in the interior, insects may freely fly upward into the bait station through the substantially open bottom portion of the vertical side wall enclosure.

24. The bait station of claim 22, wherein said roof includes a hanging plate and a hole therein for suspending said bait station.

25. A bait station for flying insects comprising:
   a vertical side wall enclosure, said vertical side wall enclosure having inner and outer surfaces, a bottom end, and a top portion;
   a roof positioned adjacent the top portion of the side wall enclosure;
   an interior defined by and fully surrounded by the inner surface of the vertical side wall enclosure and the roof;
   wherein said bottom end of the vertical side wall enclosure is substantially open causing the interior to be substantially unbounded from below, such that when bait is positioned in the interior, insects may freely fly upward into the bait station through the substantially open bottom end of the vertical side wall enclosure;
   a bait holder for holding bait, and bait holder holes on opposite sides of the vertical side wall enclosure, wherein said bait holder is sized and configured to fit into and is coupled to, said bait holder holes and extends across the interior;

wherein said vertical side wall enclosure includes a plurality of pivotally connected sections, and further comprising a hinge extending between said pivotally connected sections, said hinge including a pivot axis spaced from said vertical side wall surfaces.

26. The bait station of claim 25, wherein said roof includes an awning extending past the outer surface of the vertical side wall enclosure at an upper portion, and a hanging plate and a hole therein for suspending said bait station.

27. The bait station of claim 25, wherein said vertical side wall enclosure includes a plurality of vent holes located above said bait holder holes.

28. A bait station for flying insects comprising:

a vertical side wall enclosure, said vertical side wall enclosure including a plurality of shell elements each pivotally coupled to an adjacent shell element, inner and outer surfaces and having top and bottom portions, said vertical side wall enclosure further having a plurality of vent holes extending from the inner surface to the outer surface;

a hinge extending between said pivotally coupled shell elements, said hinge including a pivot axis spaced from said vertical side wall surfaces;

a roof positioned adjacent the top portion of the side wall enclosure; and an interior defined by the inner surface of the vertical side wall enclosure and the roof, said interior intended for holding bait, wherein attractant from such bait being permitted to permeate through said vent holes to attract flying insects;

wherein said bottom portion of the vertical side wall enclosure is substantially open causing the interior to be substantially unbounded from below, such that when bait is positioned in the interior, insects may freely fly upward into the bait station through the substantially open bottom portion of the vertical side wall enclosure, and a bait holder for holding bait, said bait holder being coupled to said vertical side wall enclosure and extending across the interior, and said bait station further includes bait holder holes on opposite sides of the vertical side wall enclosure, wherein said bait holder is sized to fit into, and is coupled to, said bait holder holes and extends across the interior.

29. The bait station of claim 28, wherein said roof includes an awning extending past the outer surface of the vertical side wall enclosure at an upper portion, and a hanging plate and a hole therein for suspending said bait station.

30. The bait station of claim 29, wherein the plurality of pivotally coupled shell elements consists of two pivotally coupled shell elements.

* * * * *

UNITED STATES PATENT AND TRADEMARK OFFICE
CERTIFICATE OF CORRECTION

PATENT NO.      : 6,546,668 B1
DATED           : April 15, 2003
INVENTOR(S)     : William L. Ball et al.

It is certified that error appears in the above-identified patent and that said Letters Patent is hereby corrected as shown below:

Column 10,
Line 40, "curve" has been replaced with -- curved --.

Signed and Sealed this

Twenty-second Day of July, 2003

JAMES E. ROGAN
*Director of the United States Patent and Trademark Office*